United States Patent [19]

Campion

[11] 4,076,273
[45] Feb. 28, 1978

[54] TRAILER HITCH

[76] Inventor: Ernest Campion, 4125 Newton Road, Walled Lake, Mich. 48085

[21] Appl. No.: 720,688

[22] Filed: Sep. 7, 1976

[51] Int. Cl.² .............................................. B60P 3/06
[52] U.S. Cl. ................................................. 280/490 R
[58] Field of Search ......... 280/490 R, 490 A, 461 A, 280/415 R, 415 A; 172/439, 448, 460

[56] References Cited

U.S. PATENT DOCUMENTS

| | | | |
|---|---|---|---|
| 2,347,081 | 4/1944 | Caton | 280/490 R |
| 3,400,949 | 9/1968 | Kendall | 280/490 R |
| 3,542,399 | 11/1970 | Myers | 280/415 A X |
| 3,865,406 | 2/1975 | Dutton | 280/490 R |

FOREIGN PATENT DOCUMENTS 603,013  6/1948  United Kingdom ............ 280/490 R

Primary Examiner—Joseph F. Peters, Jr.
Assistant Examiner—R. Schrecengost
Attorney, Agent, or Firm—Arnold S. Weintraub

[57] ABSTRACT

A trailer hitch having an incrementally, vertically adjustable ball is disclosed. The hitch includes arms which interconnect the hitch to the hydraulic arms of a tractor. The adjustable ball receives a socket of an agricultural implement.

13 Claims, 4 Drawing Figures

TRAILER HITCH

BACKGROUND OF THE INVENTION

1. Field of the Invention

The present invention pertains to hitches or hitching devices. More particularly, the present invention pertains to hitches for use with tractors. Even more particularly, the present invention pertains to hitches for tractors having means for adjusting the vertical height of an agricultural implement attached thereto.

2. Prior Art

There has been disclosed heretofore a plurality of hitches having means for vertically adjusting the ball portion thereof. See, inter alia, U.S. Pat. Nos. 3,865,406 and 3,708,183. Generally, such hitches are utilized in connection with an automotive vehicle for towing mobile homes and the like.

The art of agricultural hitches has, also, provided disclosures of means for vertically adjusting the height or elevation of an agricultural implements connected to a tractor associated hitch. See, inter alia, U.S. Pat. Nos. 3,664,686; 2,727,448; 3,400,949 and 3,472,528.

The present invention, as will subsequently be detailed, provides a ball-type vertically adjustable trailer hitch of reduced cost of manufacture, and facility of use, adapted for use with agricultural related apparatus.

SUMMARY OF THE INVENTION

In accordance with the present invention, there is provided a vertically adjustable ball-type hitch having means for incrementally vertically adjusting the ball carrying member. More particularly, the hitch hereof comprises:

a. a drawbar b. a pair of spaced apart, parallel, upstanding channel forming members, the members each having registering serrations along the vertical extent of one edge thereof, c. a ball, d. a tongue having the ball mounted thereonto, the tongue having a portion thereof provided with complementary serrations which nest in the serrations of the channel forming members, and e. means for securing the tongue in a fixed position.

The present hitch, also, comprises means for receiving the stabilizer bar of a tractor, as well as for mounting hydraulic arms thereto. Thus, the present assembly is eminently useful with a tractor having a conventional three point hitch.

For a more complete understanding of the present invention, reference is made to the following detailed description and accompanying drawing. In the drawing, like reference characters refer to like parts throughout the several views, in which:

DESCRIPTION OF THE PREFERRED EMBODIMENT

Figures 1, 2, 3, 4:
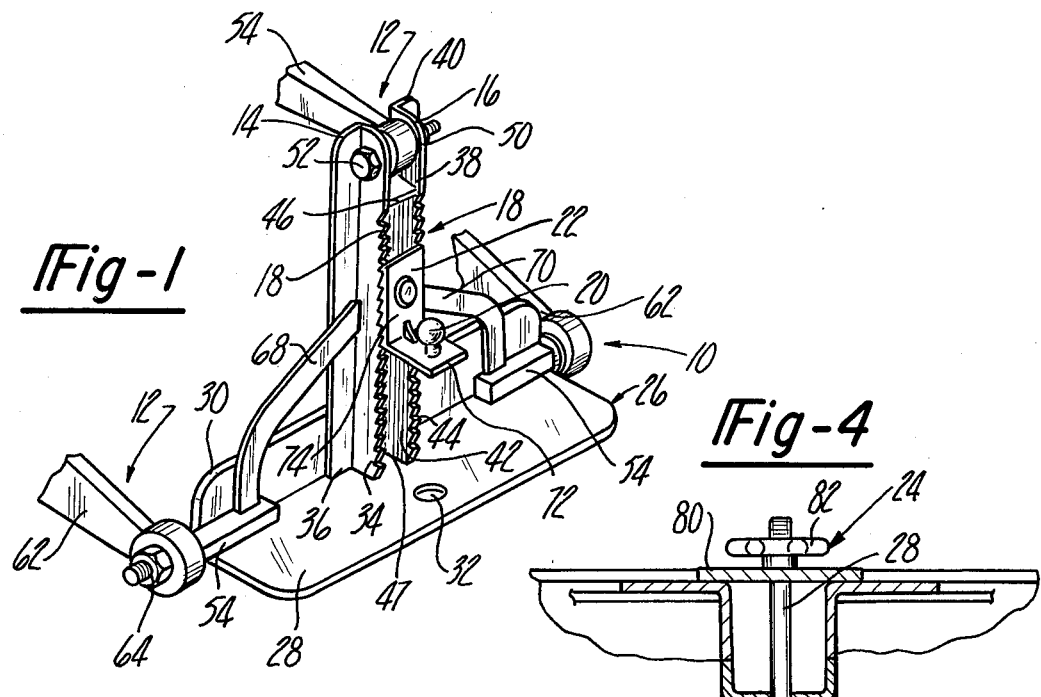
FIG. 1 is a perspective view of a trailer hitch in accordance with the present invention with broken parts of a tractor shown connected thereto.
FIG. 2 is a side elevational view of the hitch of the present invention.
FIG. 3 is a front elevational view of the hitch of the present invention.
FIG. 4 is a broken, cross-sectional view taken along the line 4—4 of FIG. 2.

Now, and with reference to the drawing, there is depicted therein a hitch, generally, denoted at 10, in accordance with the present invention. As noted hereinbefore, the hitch 10 is primarily adapted for use with a tractor having a conventional three point hitch and is, thus, interposed between the tractor and an agricultural implement. In order to differentiate between the present hitch and the three point hitch of the tractor, the present hitch will hereinafter be referred to as a trailer hitch.

Referring, again, to the drawing the hitch 10 hereof, generally, comprises means 12 for interconnecting the hitch to a towing vehicle; a pair of spaced apart, parallel, upstanding channel forming members 14, 16; means 18 formed on one edge of each of the members 14, 16 for receiving a hitch ball; a ball or hitch ball 20; a tongue 22 having the ball mounted thereonto, the tongue being mountable to the channel forming members, and means 24 for securing the tongue in a fixed position.

With more particularity, the hitch 10 hereof comprises a drawbar 26. The drawbar 26 comprises an L-shaped support plate having a horizontally disposed member 28 and a vertically extending member 30 integrally formed therewith. The member 30, as will subsequently be detailed provides a support structure for welding the other parts of the assembly thereto to impart structural integrity to the hitch.

The horizontal member or plate 30 has a central aperture 32 formed therethrough which receives secondary locking means (not shown) for an implement (not shown) to be towed, such as a clevis and pin (not shown). Although not shown, the aperture 32 can be formed anywhere along the plate or a plurality of apertures can be formed along the plate.

Disposed at the intersection of the plates 28, 30 and centrally of the drawbar are the channel forming members 14, 16. The channel forming members 14, 16 are each upstanding right angle bracket members. The member 14 comprises legs 34, 36 and the member 16 comprises legs 38, 40. The legs 34 and 38 are parallel to each other and define a channel or space 42 therebetween. The legs 36 and 40 are coplanar and extend laterally away from each other, as shown. The bases of the members 14 and 16 are secured to the plate 28 such as be welding or the like. The legs 36 and 40 are each secured to the plate 30 in a like member. Thus, the members 14 and 16 are in abutting relationship with the plate 30.

The free edge of each leg 34 and 38 is provided with the means 18. The means 18 comprises a plurality of serrations or notches 44 which are formed substantially along the entire extent of their associated legs. The serrations or notches on one leg are formed parallel and coplanar to the corresponding serrations on the other leg. An upper plate 46 traverses the channel 42 and extends between the legs 34, 38 and is secured thereto. The plate 46 functions as a stop to limit the degree of adjustability of the ball 20 in a manner to be described subsequently.

Proximate the top of each leg 34 and 38 is formed an aperture 48, 50, respectively. The apertures are in registry. The apertures receive therethrough a threaded fastener or the like 52 which extends through a tractor or similar hitch link 54. In this manner the hitch link is connected to the trailer hitch 10 hereof, by being disposed in the channel 42.

Referring, specifically, to FIGS. 1 and 3, there is shown therein the further means 12 for connecting the trailer hitch 10 to the three point hitch of the towing vehicle. At each lateral edge of the drawbar, and at the intersection of the members 28, 30 are support bars 54, 56. The bars 54, 56 are secured to the drawbar such as by welding or the like. Projecting laterally outwardly from each bar is a threaded shank 58, 60, respectively. The draft links 62 of the towing vehicle are mounted onto the shanks, as shown. A threaded bolt or the like 64 is then used to securely mount the links onto the shanks. Stops such as bushings 66 abut against the lateral edges of the drawbar to limit the horizontal axial movement of the draft links.

In lieu of the threaded interconnection, other modes can be utilized. For example, and although not shown in the drawing, the shank can be tapered, with the taper being laterally directed. An aperture formed in the tapered shank receives a cotter pin or the like after the link is mounted on the shank.

In order to provide structural integrity to the present hitch a pair of support braces 68, 70 extend between their associated channel forming member and support bar. The ends of the braces are welded or otherwise secured to the associated bars and members to render the interconnection rigid.

As hereinbefore noted, the present hitch includes a ball or ball hitch 20 which is mounted on a tongue 22. The tongue 22 comprises a right-angled rigid plate having perpendicular arms 72, 74. The arm 72 of the plate has the ball mounted thereon. The arm 72 is substantially parallel to the plate 28 of the drawbar 26, when in use, and extends toward the towed implement (not shown). The other arm 74 of the plate has its rear vertical edges provided with a opposite parallel flanges each having a plurality of notches or serrations 76 along the extent thereof. The notches 76 are complementary to the notches 42 formed on the channel forming members 14, 16 and, thus, the notches 76 interengage with and nest in the notches 42 to mount the plate and ball onto the channel forming members.

It is to be, thusly, appreciated that the ball is rendered vertically incrementally adjustable by positioning the plate arm 74 anywhere along the notched or serrated extent of the channel members 14, 16, such that the notches of the flanges interengage the notches of the channel members. Thus, an implement to be towed has its vertical elevation adjusted by moving the strap into engagement with desired notches.

In order to fixedly secure the plate arm 74 in position, the present invention, as above-noted, also, includes means 24 for securing the tongue in position. The means 24 comprises an elongated threaded bolt 78 which has one end integrally formed with or otherwise secured to the strap arm 74. The bolt 78 projects outwardly from the arm 74 and through the channel 42. The bolt has a length greater than the depth of the channel so that the bolt has a portion thereof extending beyond the channel (FIGS. 2 and 3). A bearing surface, such as a washer 80 is mounted on the bolt and abuts against the rear surfaces of opposed legs 36 and 40 of the channel forming members. In this manner the bearing surface traverses the width of the channel 42 and can be urged against the surfaces of the legs 36 and 40.

The means 24, also, comprises a handle 82 rotatably mounted onto the free end of the bolt 78. By rotating the handle along the bolt in the clockwise direction the bearing is urged into engagement with the rear surfaces of the legs 36 and 40. Contemporaneously, the notches on the flanges of the tongue are pulled or urged into the complementary notches on legs 34 and 38 to securely mount the strap in position.

It is to be further noted with respect hereto that the flanges have a width equal to the depth of the associated legs. Furthermore, the tongue has a width equal to the width of the channel, as shown.

It is to be appreciated from the preceding that there has been described herein a hitch which permits the vertical adjustment of the hitch engaging portion of a towed implement, whether it be a ball hitch or clevis and pin and which attaches, with facility, to a conventional three-point hitch.

Furthermore, the present invention can be used as a trailer hitch or drawbar. When utilized with a three-point hitch, the trailer ball hitch or clevis and pin are well back of the rear tires of the vehicle thereby eliminating the possibility of the trailer tongue or chain contacting the tractor tires on sharp turns. Also, when the three-point hitch is at maximum height, the trailer bed is at a reversed angle, thereby facilitating unloading of the trailer bed. With the present invention, there is no strain on the trailer tongue when it is set at an angle different from the tractor. Finally, a trailer is easily backed up with the present invention.

Having, thus, described the invention what is claimed is:

1. A hitch comprising:
   a. a drawbar,
   b. a pair of vertically extending spaced apart, parallel channel forming members, the members being mounted on the drawbar, each member having one edge thereof provided with a plurality of regularly spaced, aligned serrations along the vertical extent thereof, each one serration on one edge of one member being in registry with one serration on one edge of the other member,
   c. a ball for attaching a towing implement thereto,
   d. a tongue having the ball mounted thereonto, the tongue having a portion thereof provided with regularly spaced, aligned serrations which are complementary to and which nest in the serrations formed on the channel forming members,
   e. means for securing the tongue in a fixed position to the channel forming members, and
   wherein the ball is incrementally vertically adjustable by nesting the tongue serrations in selected channel forming serrations and the tongue securing means urges the serrations of the tongue into nesting relationship with the serrations of the channel forming members.

2. The hitch of claim 1 which further comprises: means for attaching the hitch to a towing vehicle.

3. The hitch of claim 1 wherein:
   the means for securing the tongue comprises:
   a. an elongated threaded bolt having one end secured to the tongue and extending through the channel defined between the channel forming members, the bolt having the free end thereof extending beyond the depth of the channel,
   b. a washer mounted on the free end of the bolt and adapted to abut against the channel forming members,
   c. a rotatable handle threadably mounted onto the free end of the bolt, and
   wherein rotation of the handle in a first direction urges the washer into abutment with the channel forming members and urges the serrations of the tongue into nesting relationship with the serrations of the channel forming members.

4. In a trailer hitch for use in towing an agricultural implement with a tractor having a three point hitch, the improvement which comprises:
   a. a drawbar,
   b. a pair of vertically extending, spaced apart, parallel channel forming members, the members being mounted on the drawbars, each member having one edge thereof provided with a plurality of regularly spaced, aligned serrations along the vertical extent thereof, each one serration on one edge of one member being in registry with one serration on one edge of the other member,
   c. a ball for attaching an agricultural implement to the trailer hitch:
   d. a tongue having the ball mounted thereonto, the tongue having a portion thereof provided with regularly spaced, aligned serrations which are complementary to and which nest in the serrations formed in the channel forming members,
   e. means for securing the tongue in a fixed position to the channel forming members,
   f. means for attaching the trailer hitch to the three point hitch, and
   wherein the ball is incrementally vertically adjustable by nesting the tongue serrations in selected channel forming member serrations and the tongue securing means urges the serrations of the tongue into nesting relationship with the associated serrations in the channel forming members.

5. The improvement of claim 4 wherein:
   the tongue comprises:
   a. a strap having first and second arms, the arms being perpendicular to each other, the ball being mounted on the first arm,
   b. a pair of spaced apart, parallel flanges extending outwardly from the lateral edges of the second arm, and 6. The improvement of claim 5, wherein:
   the means for securing the tongue comprises:
   a. an elongated threaded bolt having one end secured to the second arm, the bolt extending through and projecting beyond the channel defined between the channel forming members,
   b. a washer mounted on the free end of the bolt and adapted to abut against the channel forming members,
   c. a rotatable handle threadably mounted onto the free end of the bolt, and
   wherein rotation of the handle in a first direction urges the washer into abutment with the channel forming members and urges the serrations on the flanges into nesting relationship with the associated serrations in the channel forming members.

7. The improvement of claim 4 wherein:
   the means for securing the tongue comprises:
   a. an elongated threaded bolt having one end secured to the tongue and extending through the channel defined between the channel forming members, the bolt having the free end thereof projecting beyond the depth of the channel,
   b. a washer mounted on the free end of the bolt and adapted to abut against the channel forming members,
   c. a rotatable handle threadably mounted onto the free end of the bolt, and
   wherein rotation of the handle in a first direction urges the washer into abutment with the channel forming members and urges the serrations of the tongue into nesting relationship with the serrations of the channel forming members.

8. A hitch, comprising:
   a. drawbar,
   b. a pair of vertically extending spaced apart, parallel channel forming members, the members being mounted on the drawbar, each member having one edge thereof provided with a plurality of serrations along the vertical extent thereof, each one serration on one edge of one member being in registry with one serration on one edge of the other member,
   c. a ball for attaching a towing implement thereto,
   d. a tongue having the ball mounted thereonto, the tongue having a portion thereof provided with serrations which are complementary to and which nest in the serrations formed on the channel forming members,
   e. means for securing the tongue in a fixed position to the channel forming members, comprising:
      1. an elongated threaded bolt having one end secured to the tongue and extending through the channel defined between the channel forming members, the bolt having the free end thereof extending beyond the depth of the channel,
      2. a washer mounted on the free end of the bolt and adapted to abut against the channel forming members,
      3. a rotatable handle threadably mounted onto the free end of the bolt, and
   wherein the ball is incrementally vertically adjustable by nesting the tongue serrations in selected channel forming member serrations and rotation of the handle in a first direction urges the washer into abutment with the channel forming members and urges the serrations of the tongue into nesting relationship with the serrations of the channel forming members.

9. The hitch of claim 8 wherein:
   the tongue comprises:
   a. a strap having a first and second arms, the arms being perpendicular to each other, the ball being mounted on the first arm,
   b. a pair of spaced apart, parallel flanges extending outwardly from the lateral edges of the secound arm, and
   wherein the tongue serrations are formed along the extent of each of the flanges.

10. The hitch of claim 8 wherein:
    the bolt is secured to the second arm.

11. The hitch of claim 8 wherein:
    the towing implement is an agricultural implement, the hitch being a tractor-associated trailer hitch.

12. The hitch of claim 11 which further comprises:
    means for attaching the hitch to a three point hitch.

13. In a hitch of the type having a drawbar, a pair of channel forming members adapted to receive a ball-carrying tongue, the improvement which comprises:
    means for securing the tongue to the channel forming members comprising:
    a. an elongated threaded bolt having one end secured to the tongue and extending through the channel defined between the channel forming members, the bolt having the free end thereof extending beyond the depth of the channel, b. a washer mounted on the free end of the bolt and adapted to abut against the channel forming members, c. a rotatable handle threadably mounted onto the free end of the bolt, and wherein rotation of the handle in a first direction urges the washer into abut with the channel forming members and urges the tongue into secure engagement with the channel forming members.

* * * * *